Apr. 24, 1923.
J. B. POUK
TREAD FOR AUTO TIRES
Filed Jan. 21, 1919
1,452,894
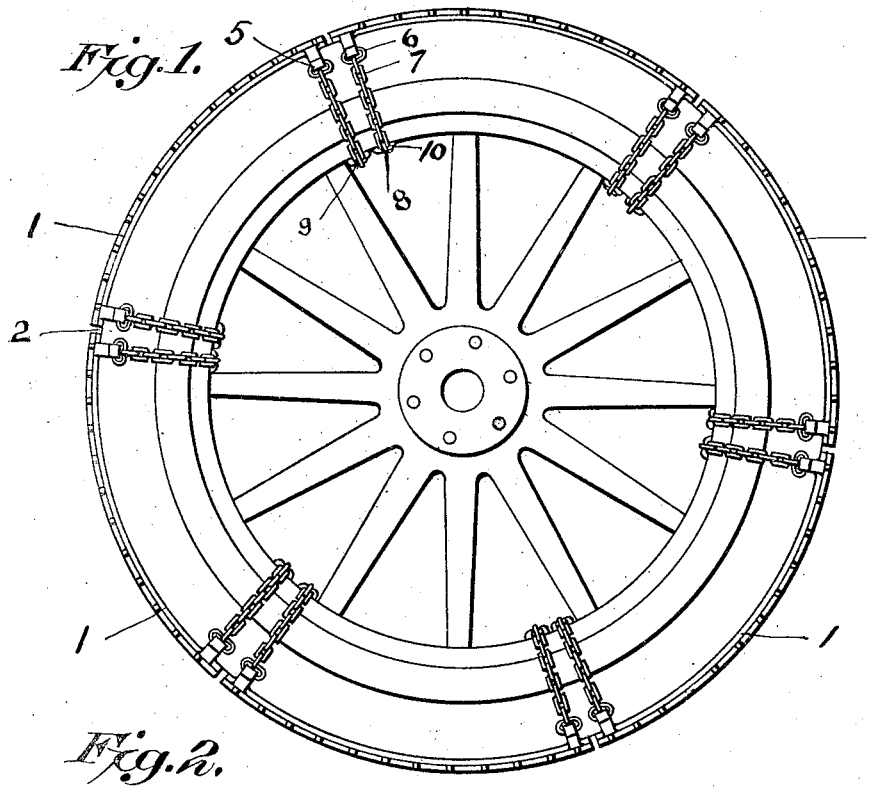
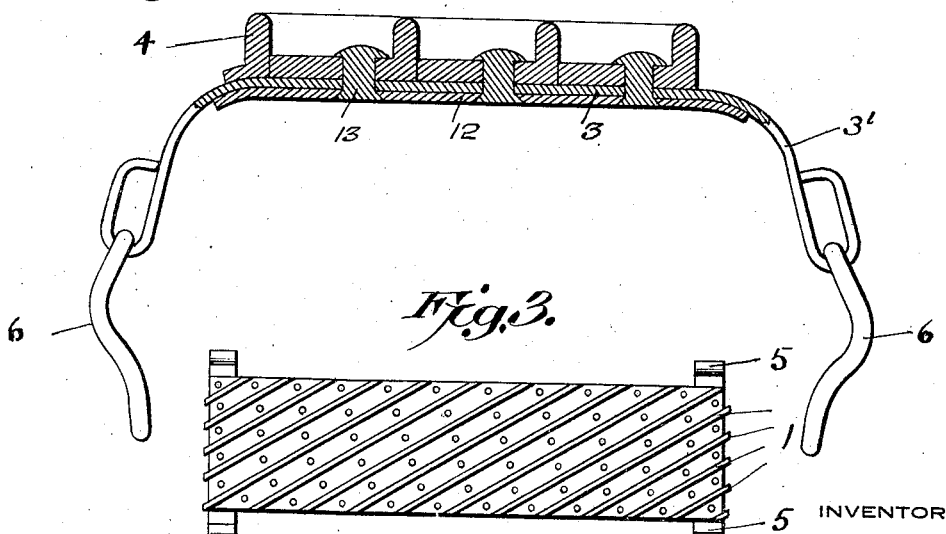
INVENTOR
John B. Pouk
BY
James J. Keeley & Co.,
ATTORNEYS.

Patented Apr. 24, 1923.

1,452,894

UNITED STATES PATENT OFFICE.

JOHN B. POUK, OF STREATOR, ILLINOIS, ASSIGNOR OF ONE-HALF TO BENJAMIN D. ROBERTS, OF STREATOR, ILLINOIS.

TREAD FOR AUTO TIRES.

Application filed January 21, 1919. Serial No. 272,302.

*To all whom it may concern:*

Be it known that I, JOHN B. POUK, a citizen of the United States, residing at Streator, in the county of La Salle and State of Illinois, have invented new and useful Improvements in Treads for Auto Tires, of which the following is a specification.

My present invention pertains to treads for auto wheels and the like and it contemplates the provision of a tread that is simple in construction and one that may be easily applied to the wheel and as easily and expeditiously removed therefrom and this without the employment of skilled labor.

The invention also contemplates the provision of a novel locking device for securely retaining the tread units on the wheel.

I have deemed it expedient, in order, to better disclose my invention to illustrate a form of fastening chain that may be employed to secure my novel treads to a wheel, although I would have it distinctly understood that said fastening forms no part of my invention. I have chosen for the purpose of illustration a fastening having a link 6, secured to the hook 5, of the tread and a series of links 7 that go to make up the chain body that encircles the rim of the wheel, and at the end of the chain a member 8 and lever 9, may be employed to prevent casual displacement of the tread from the wheel.

Figure 1, is a side elevation of the wheel equipped with my improved tread.

Figure 2, is an enlarged cross-sectional view of the tread removed from the wheel.

Figure 3 is a plan view of one of the tread members.

My novel tread comprises approximately six units indicated by 1 and spaced apart as shown at 2, so as to compensate for wear and creeping of the tire and the units by preference are formed of steel and consist of plates 3 and arranged beneath the plates 3 are plates 12 of flexible material. Secured to the plate 12 are rivets 13 that pass through the plates 3 and hold the angle irons 4 to the plates 3. The irons 4 are preferably placed at an angle of thirty degrees and the said plates 3 are provided with inwardly extending tongs 3' that terminate in hooks 5. The said hooks are provided for the connection of fastening means.

The chains that are employed to secure my novel tread portions 1, to the wheel comprise a link 6, permanently secured to the hook 5 of the tread and a series of links 7 that go to make up the chain body. At one end, the chain is provided with curved link 8 which permanently retains a locking lever 9 having a dog or projection of the usual type.

Of course links 7, are to be duplicated on the opposite side of the treads so that when the tread is secured on the wheel the links 7 will form what might be termed a continuous chain.

In the practical use of the device a tread portion is applied to the wheel in the well known manner and the chains that extend downwardly on either side are locked together at the outer side of the rim by passing the locking lever through the last link of its opposing chain, when said lock is forced backward until it rests parallel with its own chain. Also it will be seen that because of the tread being formed of removable units it will not necessitate the removal of the entire tread when a portion thereof becomes broken, hence a great saving to the user will be realized.

The device, as a whole will be seen to overcome the objection to treads at present in use and because of its construction is well capable of withstanding the rough usage imposed upon treads employed on heavy trucks, tractors and the like.

Having described my invention, what I claim and desire to secure by Letters-Patent is:—

In a tread for vehicle wheels, the combination of identically constructed tread units consisting essentially of plates formed of flexible material adapted to bear and rest upon the tread portion of a tire casing, rivets permanently secured in the flexible material, plates formed of metal superimposed on the first-named plates and having inwardly extending tongs that terminate in hooks; said second-named plates having apertures in their body portions through which the rivets of the first-named plates pass by which the plates are fixedly secured to each other, and angle-iron plates superimposed on the second plates and secured thereto by the rivets.

In testimony whereof I have hereunto set my hand in presence of two subscribing witnesses.

JOHN B. POUK.

Witnesses:
　GEORGE PALKO,
　FRANK WILSON.